United States Patent
van Willigen

(10) Patent No.: US 6,453,756 B2
(45) Date of Patent: Sep. 24, 2002

(54) MAGNETO-INDUCTIVE FLOWMETER

(76) Inventor: Arnould Leendert van Willigen, Noordmolenwerf 16, 3011 DJ, Rotterdam (NL)

( * ) Notice: Subject to any disclaimer, the term of this patent is extended or adjusted under 35 U.S.C. 154(b) by 0 days.

(21) Appl. No.: 09/728,021

(22) Filed: Dec. 1, 2000

(30) Foreign Application Priority Data

Dec. 3, 1999 (DE) .......................................... 199 58 285

(51) Int. Cl.⁷ ................................................ G01F 1/58
(52) U.S. Cl. .................................. 73/861.12; 73/861.11
(58) Field of Search ........................ 73/861.12, 861.11, 73/861.08, 861.15, 861.13, 861.16

(56) References Cited

U.S. PATENT DOCUMENTS

| | | | | |
|---|---|---|---|---|
| 4,281,552 A | * | 8/1981 | Nissen et al. ............. | 73/861.12 |
| 4,470,309 A | * | 9/1984 | Wada ....................... | 73/861.12 |
| 4,641,537 A | * | 2/1987 | Hansen et al. ........... | 73/861.12 |
| 4,715,233 A | * | 12/1987 | Neven et al. ............. | 336/198 |
| 4,932,268 A | | 6/1990 | Hafer ...................... | 73/861.12 |
| 5,540,103 A | | 7/1996 | Zingg ...................... | 73/861.12 |
| 5,544,532 A | * | 8/1996 | Brown ..................... | 73/861.12 |

FOREIGN PATENT DOCUMENTS

| | | |
|---|---|---|
| DE | 3501768 C | 7/1986 |

OTHER PUBLICATIONS

Patents Abstract of Japan, Detector of Electromagnetic Flowmeter, Application No. 64–90216, filed Apr. 10, 1989.

* cited by examiner

*Primary Examiner*—Harshad Patel

(57) ABSTRACT

A magneto-inductive flowmeter for measuring the flow rate of fluids, incorporates a measuring tube, two magnetic poles externally contacting the measuring tube, and two interconnected return plates. Each magnetic pole includes a field coil and a supporting plate-metal pole shoe. Each pole shoe is connected in the area of the opening of the field coil supporting the associated pole shoe with a return plate and features in the area outside the opening of the field coil supporting the associated pole shoe, and connecting to the same, sections which butt against the measuring tube. For obtaining an easily manufacturable magneto-inductive flowmeter in which the field coils can be precisely and securely positioned and can be provided with a large number of windings, the pole shoes are placed in the area of the opening of the field coil supporting the associated pole shoe at a distance from the measuring tube in that, in the area of the opening of the field coil supporting the respective pole shoe, the pole shoes feature sections which protrude into the opening of the field coil and extend to the end of the opening, facing away from the measuring tube, of the field coil supporting the associated pole shoe.

5 Claims, 3 Drawing Sheets

MAGNETO-INDUCTIVE FLOWMETER

This invention relates to a magneto-inductive flowmeter for measuring the flow of fluids, incorporating a measuring tube, two magnetic poles externally contacting the measuring tube, and two interconnected return plates, where each magnetic pole is provided with a field coil supporting a sheet-metal pole shoe, each pole shoe connects to a return plate at the open end of the field coil supporting the respective pole shoe and each is provided on the outside of, and extending from, the open end of the respective field coil supporting the associated pole shoe with sections which are in contact with the measuring tube. A flowmeter of this type has been described earlier, for instance in the German patent document DE 35 01 768 C2.

The underlying concept of a magneto-inductive flowmeter for measuring the flow of a fluid, or medium, goes all the way back to Faraday who in 1832 proposed to employ the principle of electrodynamic induction for measuring flow rates. According to Faraday's law of induction, a moving fluid that contains charge carriers and flows through a magnetic field generates an electrical field intensity perpendicular to the flow direction and perpendicular to the magnetic field. A magneto-inductive flowmeter employs this phenomenon by means of a magnet which, typically consisting of two magnetic poles each associated with a field coil, generates a magnetic field perpendicular to the direction of the flow in the measuring tube. Within this magnetic field, each volume element of the flowing medium that travels through the magnetic field and contains a certain number of charge carriers, contributes, by virtue of the field intensity generated in the volume element concerned, to a measuring voltage that can be collected by way of test electrodes. In prior-art magneto-inductive flowmeters, the test electrodes are so designed as to be either electrically or capacitively coupled to the flowing medium. Of particular significance in magneto-inductive flowmeters is the proportionality between the measuring voltage and the flow rate of the medium as averaged over the cross section of the tube, i.e. between the measuring voltage and the volume flow.

In the prior-art magneto-inductive flowmeter described above, two mutually opposite pole shoes are in essentially full contact with the measuring tube. Each of these pole shoes supports a saddle-shaped field coil into the opening of which protrudes a core section which extends all the way to, and rests against, the pole shoe. These core sections are constituted of sheet-metal segments integrally connected to the return plates which enclose the entire assembly consisting of measuring tube, pole shoes and field coils. The result is a compact magneto-inductive flowmeter capable of producing a constant magnetic field sufficiently strong for magneto-inductive flow-rate measurements, given that there are virtually no air gaps between the pole shoe and the circumference of the tube or in the area of the the core sections which gaps might interfere with the magnetic flux.

However, that prior-art design has a number of drawbacks. For example, producing such conventional magneto-inductive flowmeters is a complex process insofar as it is necessary during the assembly of the individual components of the magneto-inductive flowmeter to mount the field coils on the pole shoes which completely hug the measuring tube, leaving no possibility for the localized attachment of the field coil. Moreover, the core sections which form an integral part of the return plates are mounted on the pole shoe in a recess provided in the return plates, meaning that the opening of the respective field coil which determines the size of the recess must be of a diameter large enough to allow access to the bottom of the recess for a mounting tool, for instance a spot welder or a riveter. This also severely limits the number of windings of the field coil, given that in view of these mounting requirements, the field coil cannot be of as small a diameter as might be desirable.

It is the objective of this invention to introduce a magneto-inductive flowmeter which is easy to manufacture and which can accommodate a large field coil with many windings.

The magneto-inductive flowmeter according to this invention, designed to solve the above-mentioned problem, is characterized in that the pole shoes, located in the open-end area of the field coil supporting the pole shoe concerned, are positioned at a distance from the measuring tube in such fashion that, in the area of the opening of the field coil supporting the individual pole shoes, the pole shoes are provided with sections which protrude into the field coil and extend to the far end of the opening of the pole-shoe-supporting field coil away from the measuring tube. This invention thus makes it possible to attach a radially configured return plate to the pole shoe outside the field coil, providing sufficient accessibility for practically any type of mounting tool. Obviating the need for recess mounting eliminates the minimum size restrictions for the diameter of the field coil so that even field coils with a very small diameter can be employed. By the same token, a field coil with a smaller inner diameter can accommodate a larger number of windings which permit the generation of a larger magnetic field. Moreover, the pole-shoe sections positioned at a distance from the measuring tube and protruding into the field-coil opening allow for a simple and secure placement of the field coil during the assembly of the individual components of the magneto-inductive flowmeter according to this invention.

In a preferred design enhancement of the magneto-inductive flowmeter according to this invention, the sections of each pole shoe located outside the opening of the field coil and contacting the measuring tube connect to a section angled away from the measuring tube. This pole-shoe configuration offers a number of advantages: The sections angled away from the measuring tube add support and stabilization to the field coils which substantially facilitates the positioning of the field coils during the assembly process of the magneto-inductive flowmeter. Also, the sections angled away from the measuring tube define the direction of the magnetic field in the area near the electrodes. Indeed, if in a further, preferred design enhancement of this invention, the sections of the mutually opposite pole shoes, angled away from the measuring tube, are lined up parallel to one another, it is possible to obtain particularly good homogeneity of the magnetic field generated by the field coils over a very wide range and essentially throughout the cross section of the measuring tube. Finally, the sections angled away from the measuring tube electrically shield the electrodes, and thus the measuring voltage collected from the electrodes, from the coil signal. This, in turn, further improves the signal-to-noise ratio of the measuring voltage collected in the magneto-inductive flowmeter according to the invention.

In another, preferred design enhancement of the magneto-inductive flowmeter according to this invention, the pole shoes are provided, at the end of the opening of the pole-shoe supporting field coil away from the measuring tube, with a pole-shoe section which interconnects the pole-shoe sections that protrude into the field-coil opening and extend to the end of the opening, facing away from the measuring tube, of the field coil supporting the respective pole shoe. This allows the pole shoe to be produced as a single unit which substantially improves its stability. It also permits planar contact between the return plate and the pole-shoe section which, in turn, simplifies the connection of the return plates with the pole shoe.

In another preferred design enhancement according to this invention, the field coil is saddle-shaped. This allows the field coil to match the curvature of the pole shoe contacting the measuring tube.

In a preferred design enhancement according to this invention, the magneto-inductive flowmeter can be provided with certain application-specific properties by producing the pole shoes and the return plates from mutually different magnetizable materials.

Finally, in a preferred design enhancement of the magneto-inductive flowmeter according to this invention, the return plates surround the magnetic poles and the measuring tube in peripheral fashion.

There are numerous ways in which the magneto-inductive flowmeter according to this invention can be configured and further enhanced. In this context, reference is made to the dependent patent claims and to the following detailed description of preferred embodiments of this invention with the aid of the drawings in which:

Figure 1:
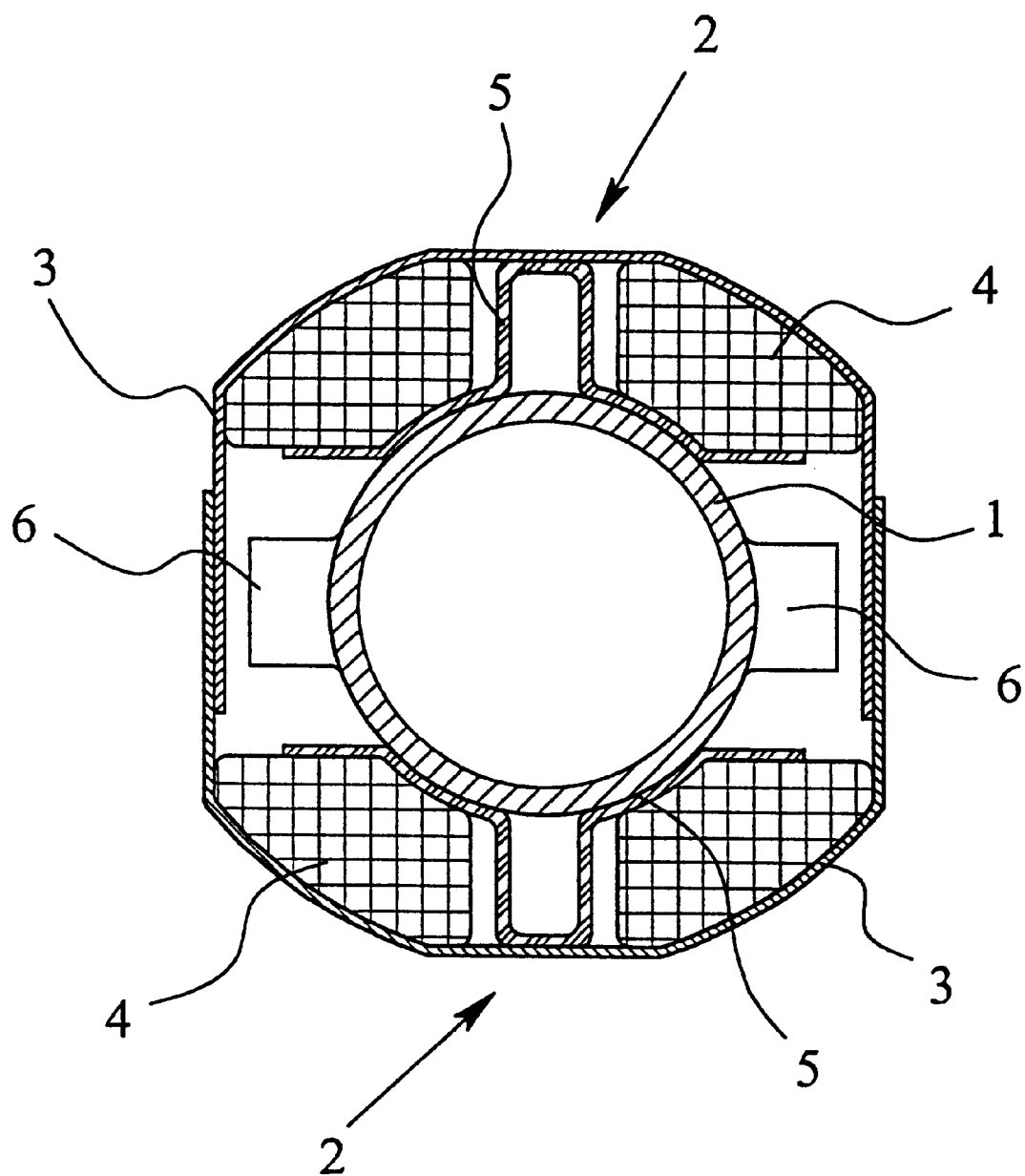
FIG. 1 is a schematic, cross-sectional view of a magneto-inductive flowmeter according to a first invention embodiment.

A magneto-inductive flowmeter according to a first invention embodiment is illustrated in FIG. 1. In this case, two mutually opposite magnetic poles 2 are in external contact with the measuring tube 1 through which flows the medium whose flow rate is to be measured. This assembly of measuring tube 1 and magnetic poles 2 is surrounded and fully enclosed by two return plates 3, each slipped over the assembly on the side of a corresponding magnetic pole 2, and both laterally overlapping and mutually connected. For connecting the two return plates 3, simple clamping may suffice; preferably, however, the return plates 3 are welded together—ideally spot-welded—or riveted together. The thickness of the return plates is typically about 1 mm.

Each magnetic pole includes a field coil 4 and a pole shoe 5. The pole shoes 5 are also made from plate metal, typically 1 mm thick and they include sections which firmly butt against the measuring tube 1 and match the outer curvature of the latter. However, in the area of the opening of the field coil 4, the pole shoes 5 are positioned at a distance from the measuring tube 1. As can be seen in FIG. 1, sections of the pole shoes 5 protrude into the openings of the field coils 4, extending all the way to the end of the opening of the field coil 4 facing away from the measuring tube 1, and transitioning into a pole-shoe section which interconnects these through-sections. In the first preferred embodiment, this interconnecting pole-shoe section which extends more or less tangentially relative to the measuring tube 1 is used for attaching the pole shoe 5 to its associated return plate 3.

As can also be seen in FIG. 1, the area in which the return plate 3 is to be connected to the pole shoe 5 is fully accessible, with no restrictions relative to the size or shape of a mounting tool such as a riveter or spot welder. In this first preferred embodiment of the invention, the electrodes 6 are capacitively coupled to the flowing medium. In the direction of the electrodes 6, the sections of the pole shoes 5 contacting the measuring tube 1 transition into sections which are angled away from the measuring tube 1. FIG. 1 clearly shows that by virtue of the sections of the pole shoes 5 protruding into the opening of the field coil 4 and, respectively, the sections angled away from the measuring tube 1, it is possible to precisely position and align the field coils 4, which significantly facilitates the assembly process of the various components of the magneto-inductive flowmeter according to the first preferred embodiment of this invention.

The sections of the mutually opposite pole shoes 5 which are angled away from the measuring tube 1 extend parallel to one another. As a result, there is particularly good homogeneity of the magnetic field generated by the two mutually opposite magnetic poles 2 even in the fringe area and thus throughout the cross section of the measuring tube 1. In addition, the sections that are angled away from the measuring tube 1 provide for an electrical shielding of the coil signal from the measuring voltage collected from the electrodes 6 which results in an improved signal-to-noise ratio.

Figure 2:
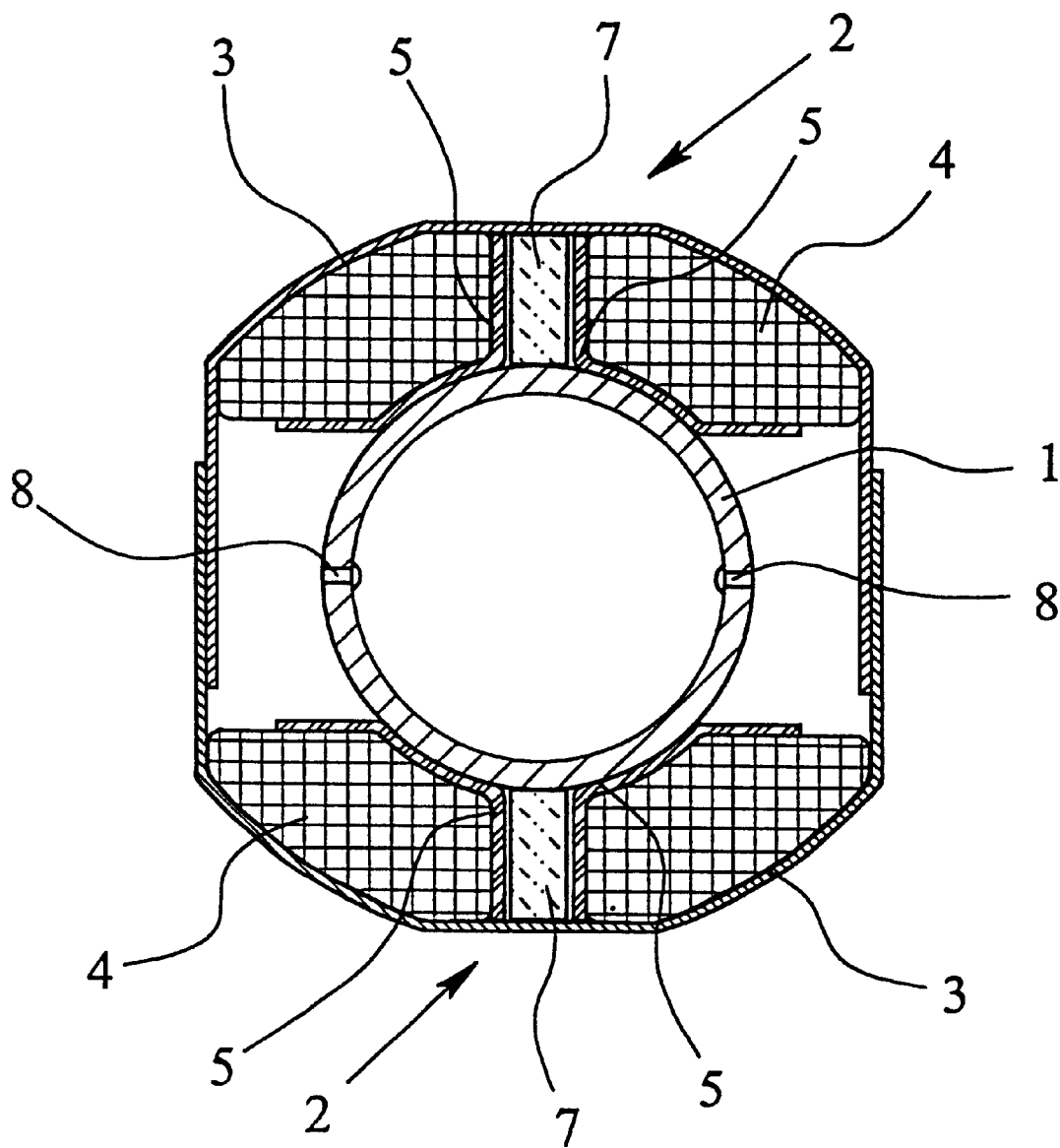
FIG. 2 is a schematic, cross-sectional view of a magneto-inductive flowmeter according to a second invention embodiment.

FIG. 2 is a schematic, cross-sectional illustration of a magneto-inductive flowmeter according to a second preferred embodiment of this invention. In contrast to the first preferred embodiment depicted in FIG. 1, the magneto-inductive flowmeter in the second preferred embodiment of this invention does not include a pole-shoe section that interconnects the sections of a pole shoe 5 that protrude into the opening of the field coil 4. Instead, it is provided with a block-shaped spacer 7 consisting of a non-magnetizable material. In this case, the pole shoe 5 is attached to the return plate 3 by spot welding since there is not enough room for riveting.

FIG. 2 also shows that, in contrast to the first preferred embodiment of this invention as illustrated in FIG. 1, where the sections of the pole shoe 5 which protrude into the opening of the field coil 4 are located at a distance from the field coil 4, the field coil 4 itself can extend directly to the sections which protrude into the opening of the field coil 4. This fully utilizes the space available for the field coil 4 which allows for a maximum number of windings. FIG. 2 further indicates schematically that it is possible to use electrodes 8 which are electrically coupled to the medium flowing through the measuring tube 1, in lieu of the electrodes 6 which are capacitively coupled to the flowing medium.

Figure 3:
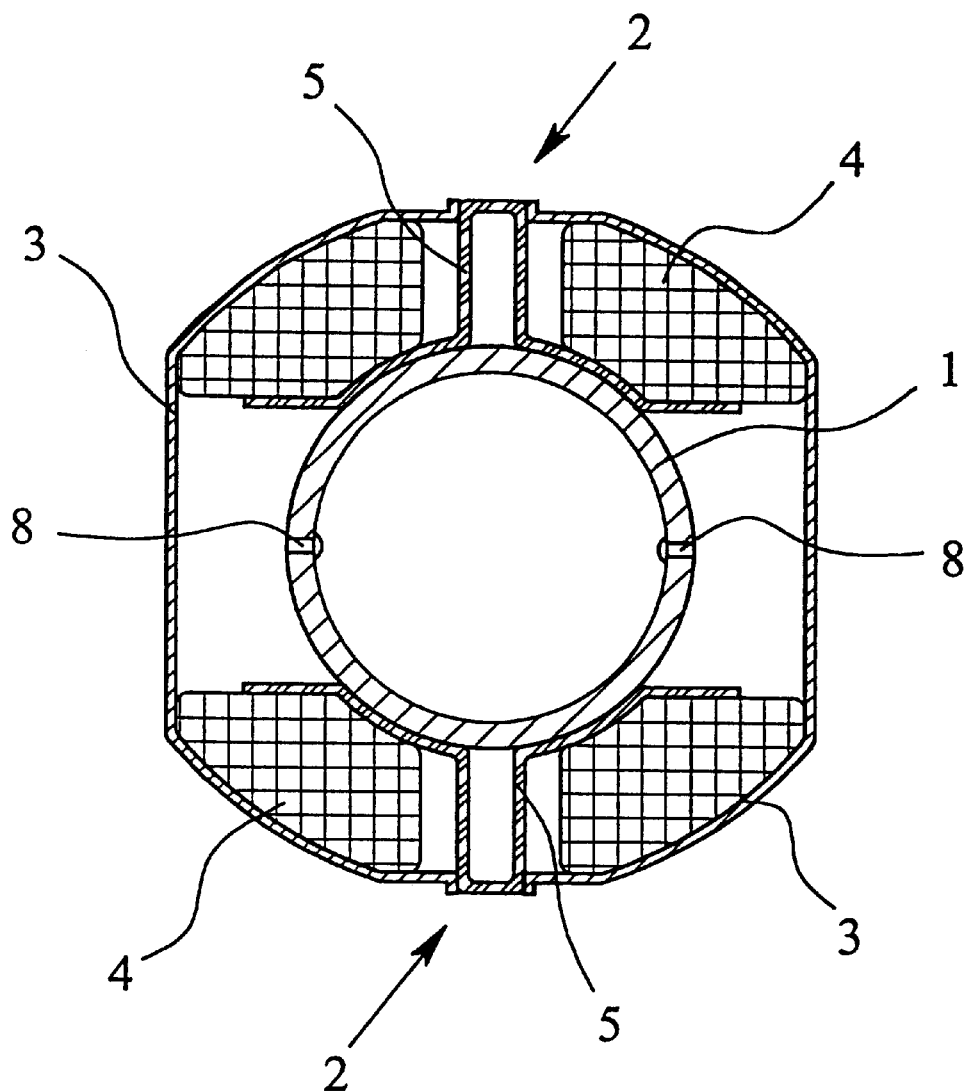
FIG. 3 is a schematic, cross-sectional view of a magneto-inductive flowmeter according to a third invention embodiment.

Finally, FIG. 3 is a schematic, cross-sectional illustration of a magneto-inductive flowmeter according to a third preferred embodiment of this invention. As one particular feature of this embodiment, the return plates 3 are not slipped over the assembly on the sides corresponding to the two mutually opposite magnetic poles 2 but are instead offset by 90° relative to the former. The ends of the return plates 3 thus meet the sections of the pole shoe 5 protruding into the opening of the field coil 4, at which point they are spot-welded to the pole shoes 5. This configuration of the return plates 3 may be more advantageous for certain installation layouts.

What is claimed is:

1. A magneto-inductive flowmeter for measuring the flow rate of fluids, incorporating a measuring tube, two magnetic poles externally contacting the measuring tube and two interconnected return plates, wherein each magnetic pole includes a field coil and a supporting metal pole shoe, each shoe is connected in the opening of the associated field coil to a return plate and includes sections which extend outside the area of the opening of the field coil supporting the respective pole shoe and are in contact with the measuring tube, wherein in the area of the opening of the field coil supporting the associated pole shoe, the pole shoes are positioned at a distance from the measuring tube, said pole shoes including sections in the area of the opening of the field coil supporting the associated pole shoe which protrude into the opening of the field coil and extend to the end of the opening of the field coil facing away from the measuring tube and, outside the area of the opening of the field coil, sections of the pole shoes contacting the measuring tube each transition into a section that is angled away from the measuring tube, and the sections of the mutually opposite pole shoes which are angled away from the measuring tube extend parallel to one another.

2. The magneto-inductive flowmeter as in claim 1, wherein at the end facing away from the measuring tube of the opening of the field coil supporting the respective pole shoes, the pole shoes each include a section which interconnects the section that protrudes into the opening of the field coil and extends to the end facing away from the measuring tube of the area of the opening of the field coil supporting the associated pole shoe.

3. The magneto-inductive flowmeter as in claim 1 or 2, wherein each field coil is saddle-shaped and particularly adapted to match the curvature of the pole shoe contacting the measuring tube.

4. The magneto-inductive flowmeter as in claim 1 or 2, wherein the pole shoes and the return plates consist of mutually different magnetizable materials.

5. The magneto-inductive flowmeter as in claim 1 or 2, wherein the return plates peripherally surround the magnetic poles and the measuring tube.

* * * * *